(12) United States Patent
Nakabayashi et al.

(10) Patent No.: US 11,901,834 B2
(45) Date of Patent: Feb. 13, 2024

(54) POWER CONVERSION DEVICE SUPPORTED BY INTERSECTING PANEL

(71) Applicant: TOSHIBA MITSUBISHI-ELECTRIC INDUSTRIAL SYSTEMS CORPORATION, Chuo-ku (JP)

(72) Inventors: Shigeyuki Nakabayashi, Chuo-ku (JP); Hitoshi Sadakuni, Chuo-ku (JP); Shotaro Murakami, Chuo-ku (JP); Ikuto Udagawa, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 575 days.

(21) Appl. No.: 17/257,739

(22) PCT Filed: Jul. 20, 2018

(86) PCT No.: PCT/JP2018/027311
§ 371 (c)(1),
(2) Date: Jan. 4, 2021

(87) PCT Pub. No.: WO2020/017033
PCT Pub. Date: Jan. 23, 2020

(65) Prior Publication Data
US 2021/0273576 A1    Sep. 2, 2021

(51) Int. Cl.
*H02M 7/00* (2006.01)
*H02M 7/483* (2007.01)
*H02M 5/04* (2006.01)

(52) U.S. Cl.
CPC ......... *H02M 7/003* (2013.01); *H02M 7/4835* (2021.05); *H02M 5/04* (2013.01)

(58) Field of Classification Search
None
See application file for complete search history.

(56) References Cited

U.S. PATENT DOCUMENTS

| | | | | | |
|---|---|---|---|---|---|
| 4,703,395 | A | * | 10/1987 | Cline | H05K 1/036 428/116 |
| 4,748,539 | A | * | 5/1988 | Fukuyama | H05K 7/1424 206/592 |
| 4,827,372 | A | * | 5/1989 | Day | H05K 7/14 174/101 |
| 7,411,796 | B2 | * | 8/2008 | Lee | G06F 1/182 361/753 |

(Continued)

FOREIGN PATENT DOCUMENTS

| CN | 108092526 | A | * | 5/2018 |
|---|---|---|---|---|
| CN | 109245563 | A | * | 1/2019 |

(Continued)

OTHER PUBLICATIONS

International Search Report dated Aug. 21, 2018 in PCT/JP2018/027311 filed on Jul. 20, 2018, 1 page.

*Primary Examiner* — Timothy J. Dole
*Assistant Examiner* — Muhammed Azam
(74) *Attorney, Agent, or Firm* — Oblon, McClelland, Maier & Neustadt, L.L.P.

(57) ABSTRACT

A power conversion device includes a base, a first stage, a first support portion, and a support member. At least one first power conversion unit is mounted on the first stage. The first support portion extends in a normal direction of the base and is fixed to the base and the first stage. The support member includes a first panel and a second panel. The first panel and the second panel are disposed on the base to support the first stage in the Z-axis direction. The first panel and the second panel are integrally formed to intersect with each other.

8 Claims, 6 Drawing Sheets

(56) References Cited

U.S. PATENT DOCUMENTS

| | | | | |
|---|---|---|---|---|
| 2003/0030990 | A1* | 2/2003 | King | G06F 21/31 |
| | | | | 312/223.1 |
| 2005/0265002 | A1* | 12/2005 | Armstrong | H05K 7/20909 |
| | | | | 361/719 |
| 2006/0039127 | A1* | 2/2006 | West | H05K 1/144 |
| | | | | 257/691 |
| 2012/0188712 | A1* | 7/2012 | Ishibashi | H01L 23/473 |
| | | | | 361/688 |
| 2013/0003299 | A1* | 1/2013 | Wissner | H05K 7/14325 |
| | | | | 361/695 |
| 2020/0020609 | A1* | 1/2020 | Yamaura | H01L 23/473 |

FOREIGN PATENT DOCUMENTS

| | | | | |
|---|---|---|---|---|
| DE | 4333387 C2 * | 9/1997 | | H02M 7/003 |
| DE | 19937671 A1 * | 2/2001 | | H02M 7/003 |
| DE | 202013004551 U1 * | 9/2013 | | H02M 7/003 |
| EP | 3206468 A1 * | 8/2017 | | H02M 7/00 |
| EP | 3270499 A1 * | 1/2018 | | |
| EP | 3451523 A1 * | 3/2019 | | |
| JP | 03142899 A * | 6/1991 | | H01B 17/56 |
| JP | 10-323015 A | 12/1998 | | |
| JP | 6345379 B1 * | 6/2018 | | H02M 7/003 |
| KR | 100901539 B1 * | 6/2009 | | |
| TW | 201802631 A * | 1/2018 | | |
| WO | WO-2008074274 A1 * | 6/2008 | | H02M 7/003 |
| WO | WO-2009115124 A1 * | 9/2009 | | H01L 24/72 |
| WO | WO-2012136465 A2 * | 10/2012 | | H05K 5/0021 |
| WO | WO-2013179463 A1 * | 12/2013 | | H02J 3/01 |
| WO | WO-2016170910 A1 * | 10/2016 | | H02M 7/48 |
| WO | WO-2019003432 A1 * | 1/2019 | | H01B 17/56 |
| WO | WO-2020017033 A1 * | 1/2020 | | H02M 7/003 |

* cited by examiner

POWER CONVERSION DEVICE SUPPORTED BY INTERSECTING PANEL

TECHNICAL FIELD

The present invention relates to a power conversion device formed by stacking stages on which power conversion units are mounted.

BACKGROUND ART

Power conversion devices have conventionally been known, each of which is formed by stacking stages on which power conversion units are mounted. For example, Japanese Patent Laying-Open No. 10-323015 (PTL 1) discloses a semiconductor power conversion device formed by stacking stages on which a high-speed switching element stack and a high-speed diode stack are mounted.

CITATION LIST

Patent Literature

PTL 1: Japanese Patent Laying-Open No. 10-323015

SUMMARY OF INVENTION

Technical Problem

As the number of stacks of stages on which power conversion units are mounted increases, the center of gravity of the power conversion device increases, to thereby decrease the stability of the power conversion units. As a result, the quake resistance of the power conversion device may decrease.

For example, by fixing support members forming a brace structure between the stages, the quake resistance of the power conversion device can be improved. However, such support members forming a brace structure often need to be precisely designed, for example, in accordance with the distance between the stages of the power conversion device.

The present invention has been made in order to solve the above-described problems, and an object of the present invention is to improve the quake resistance of a power conversion device, which is formed by stacking stages on which power conversion units are mounted, while reducing the manufacturing cost and the assembly cost.

Solution to Problem

A power conversion device according to the present invention includes: a base; a first stage; a first support portion; a first panel; and a second panel. At least one first power conversion unit is mounted on the first stage. The first support portion extends in a normal direction of the base and is fixed to the base and the first stage. The first panel and the second panel are disposed on the base to support the first stage in the normal direction. The first panel and the second panel are integrally formed to intersect with each other.

Advantageous Effects of Invention

According to the power conversion device of the present invention, the first panel and the second panel integrally formed to intersect with each other can improve the quake resistance while reducing the manufacturing cost and the assembly cost.

DESCRIPTION OF EMBODIMENTS

Figure 1:
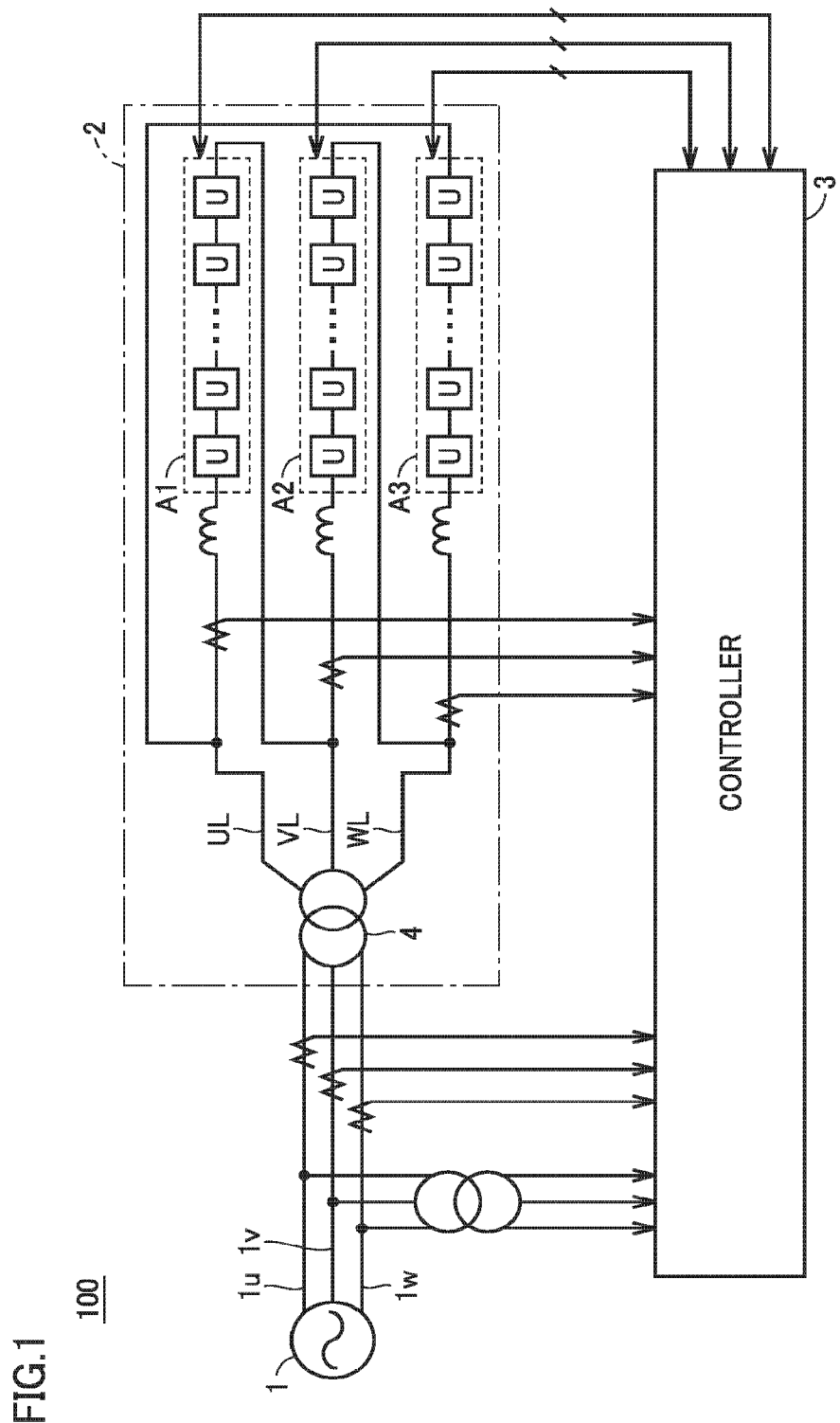
FIG. 1 is a circuit block diagram showing a configuration of a power conversion device according to an embodiment.

FIG. 1 is a circuit block diagram showing a configuration of a power conversion device 100 according to an embodiment. As shown in FIG. 1, power conversion device 100 includes a modular multilevel converter (hereinafter referred to as MMC) 2 and a controller 3 that controls MMC 2. According to power conversion device 100 including MMC 2 capable of achieving high breakdown voltage and large capacity, ultrahigh-voltage direct current (UHVDC) transmission can be performed, for example.

MMC 2 is connected to a power system 1 through a transformer 4. MMC 2 includes transformer 4 and AC lines UL, VL, WL of three phases (a U-phase, a V-phase, and a W-phase). Transformer 4 includes three primary windings and three secondary windings. These three primary windings each are connected to a corresponding one of power transmission lines $1u$, $1v$, and $1w$ of three phases in power system 1. These three secondary windings each are connected to one terminal of a corresponding one of AC lines UL, VL, and WL.

MMC 2 further includes arms A1 to A3. Arm A1 is connected between the other terminal of AC line UL and the other terminal of AC line VL. Arm A2 is connected between the other terminal of AC line VL and the other terminal of AC line WL. Arm A3 is connected between the other terminal of AC line WL and the other terminal of AC line UL. In other words, arms A1 to A3 are connected by delta connection.

Each of arms A1 to A3 has a plurality of power conversion units U connected in series. Each of the plurality of power conversion units U performs bidirectional power conversion according to a control signal from controller 3.

Figure 2:
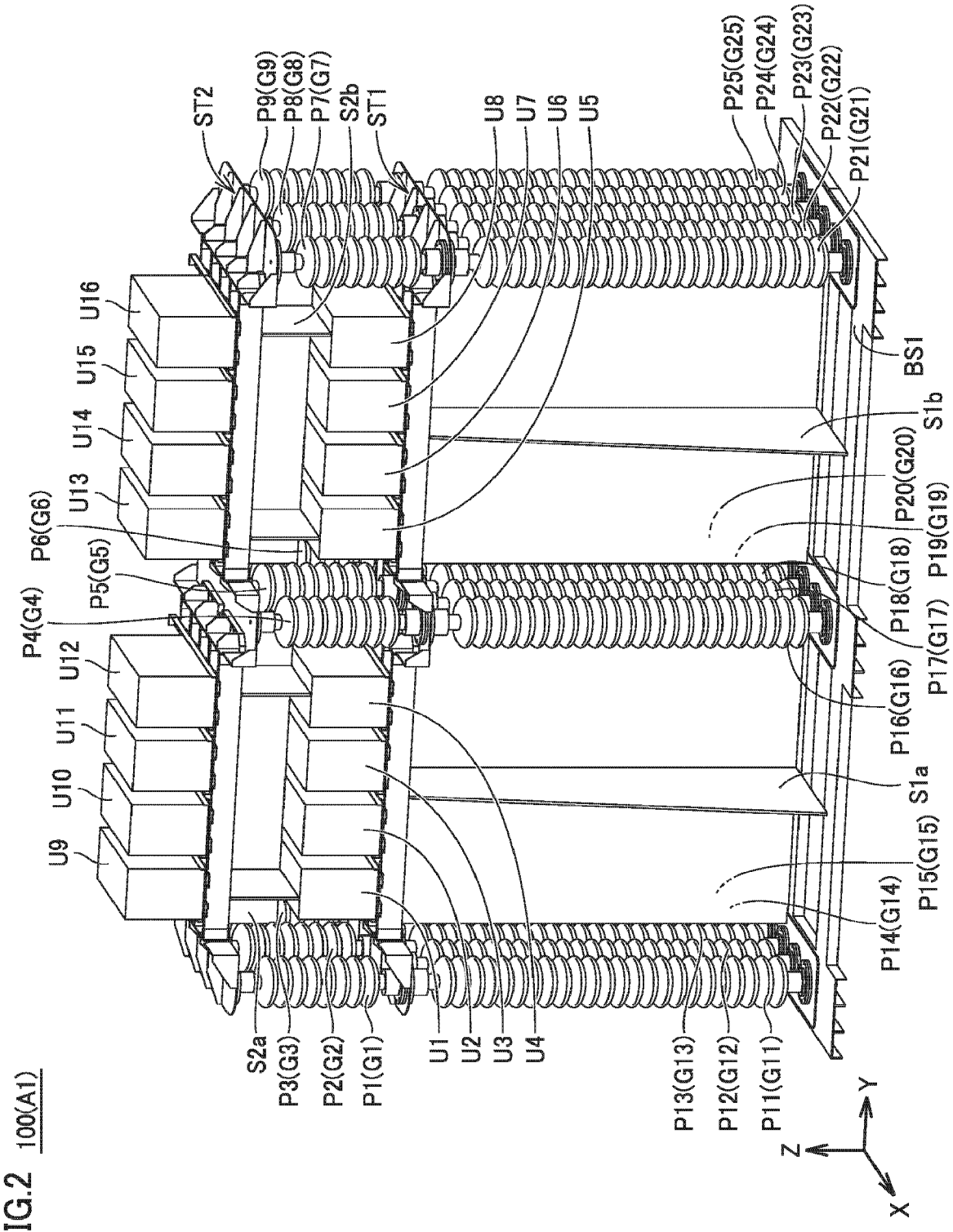
FIG. 2 is a perspective view showing an external appearance of an arm in FIG. 1.

FIG. 2 is a perspective view showing an external appearance of arm A1 in FIG. 1. As shown in FIG. 2, power conversion device 100 includes power conversion units U1 to U16, a stage ST1 (the first stage), a stage ST2 (the second stage), support members S1$a$, S1$b$, S2$a$, and S2$b$, a base BS1, base posts P11 to P25 (the first support portion), and stage posts P1 to P9 (the second support portion). Each of power conversion units U1 to U16 corresponds to power conversion unit U in FIG. 1. Power conversion units U1 to U16 are connected in series.

Each of base posts P11 to P25 extending in the normal direction of base BS1 (in a Z-axis direction) is fixed to base BS1 and stage ST1. Power conversion units U1 to U8 are mounted on stage ST1. Base posts P11 to P25 have outer peripheral portions including their respective insulators G11 to G25. Specifically, base posts P11 to P25 each have an outer peripheral surface formed of an insulating material. Thus, base posts P11 to P25 each having an outer peripheral surface formed of an insulating material can suppress electric shock due to contact with base posts P11 to P25 even when a potential difference arises between base BS1 and stage ST1 during the operation of power conversion device 100.

Each of support members S1a and S1b is disposed on base BS1 to support stage ST1 in the Z-axis direction. Since support members S1a and S1b suppress shaking of stage ST1, the quake resistance of power conversion device 100 can be improved.

Figure 3:
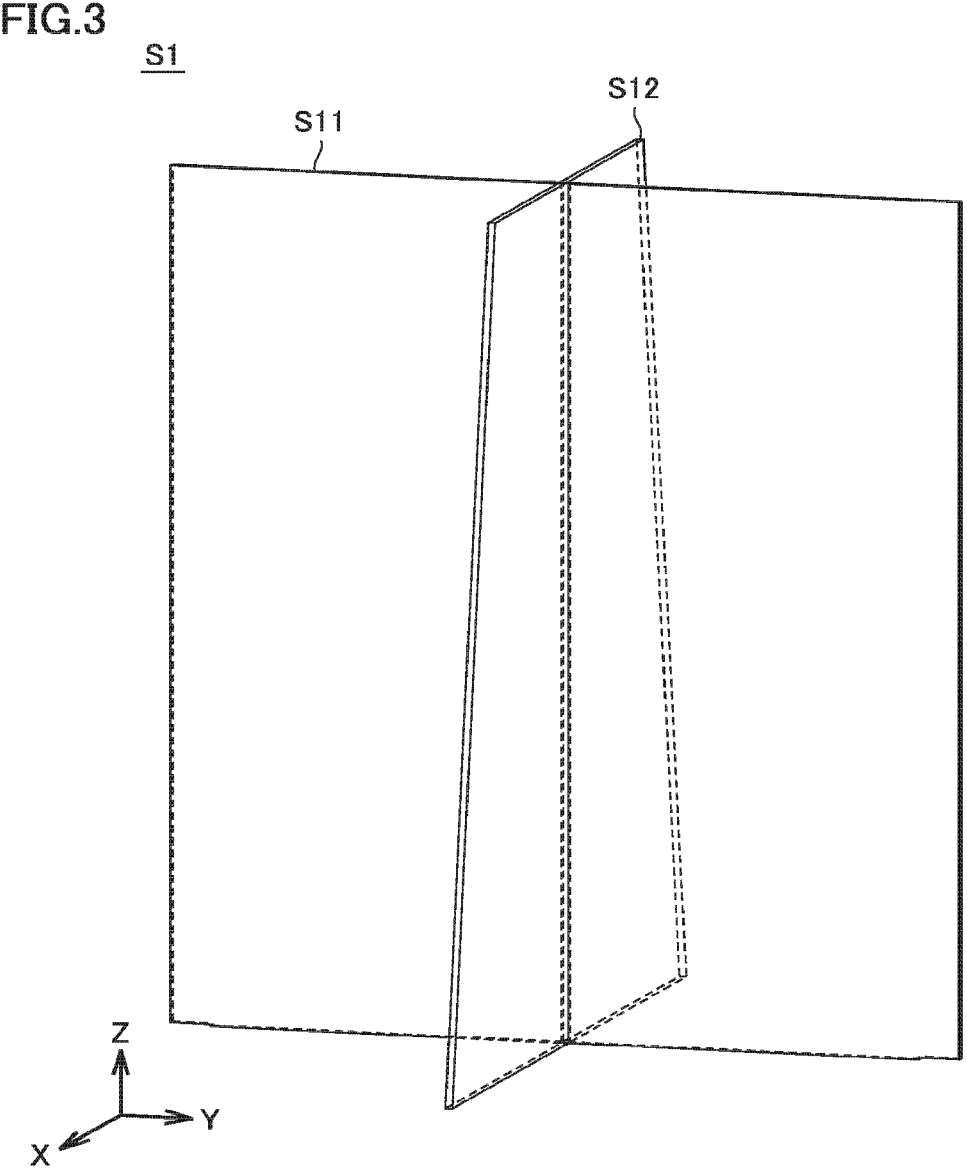
FIG. 3 is a perspective view showing an external appearance of a support member disposed on a base in FIG. 2.
Figure 4:
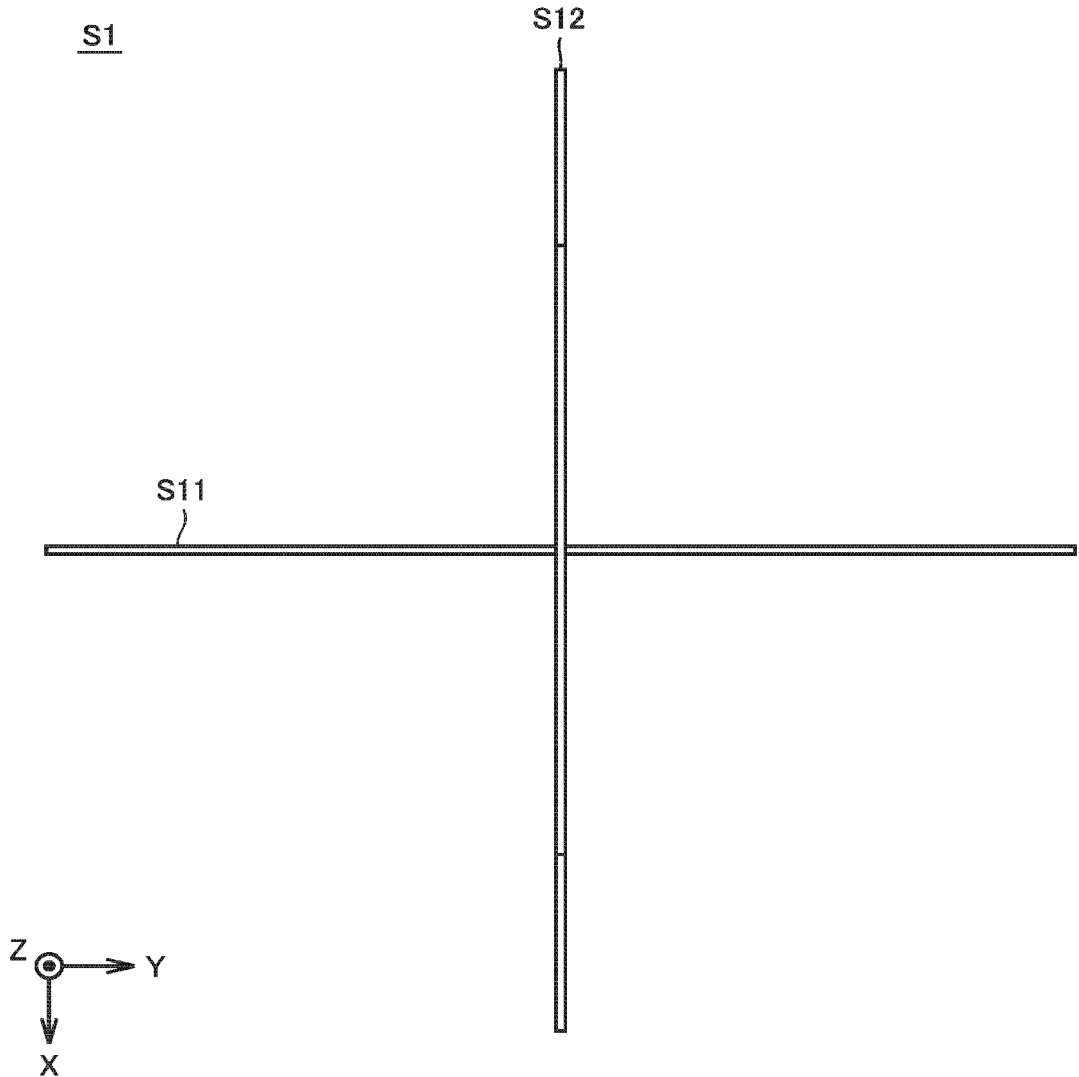
FIG. 4 is a plan view of the support member disposed on the base in FIG. 2, viewed in a Z-axis direction.

FIG. 3 is a perspective view showing external appearances of support members S1a and S1b disposed on base BS1 in FIG. 2. FIG. 4 is a plan view showing support members S1a and S1b disposed on base BS1 in FIG. 2, viewed in the Z-axis direction. In FIGS. 3 and 4, support members S1a and S1b are referred to as S1.

As shown in FIGS. 3 and 4, support member S1 includes a panel S11 (the first panel) and a panel S12 (the second panel). Panels S11 and S12 are integrally formed so as to be orthogonal to each other. Each of panels S11 and S12 is formed of an insulating material.

Since panels S11 and S12 are orthogonal to each other, stage ST1 is supported by panels S11 and S12 in a well-balanced manner against vibrations in any direction, so that the quake resistance of power conversion device 100 can be further improved. Furthermore, since each of panels S11 and S12 is formed of an insulating material, the potential difference between base BS1 and stage ST1 caused during the operation of power conversion device 100 is maintained, so that the influence on the operation of power conversion device 100 can be prevented.

Referring again to FIG. 2, stages ST1 and ST2 are connected by stage posts P1 to P9 extending in the Z-axis direction. Power conversion units U9 to U16 are mounted on stage ST2. Stage posts P1 to P9 have outer peripheral portions including their respective insulators G1 to G9. Specifically, stage posts P1 to P9 each have an outer peripheral surface formed of an insulating material. Thus, stage posts P1 to P9 each having an outer peripheral surface formed of an insulating material can suppress electric shock due to contact with stage posts P1 to P9 even when a potential difference arises between stages ST1 and ST2 during the operation of power conversion device 100.

Each of support members S2a and S2b is disposed on stage ST1 to support stage ST2 in the Z-axis direction. Since support members S2a and S2b suppress shaking of stage ST2, the quake resistance of power conversion device 100 can be improved.

Figure 5:
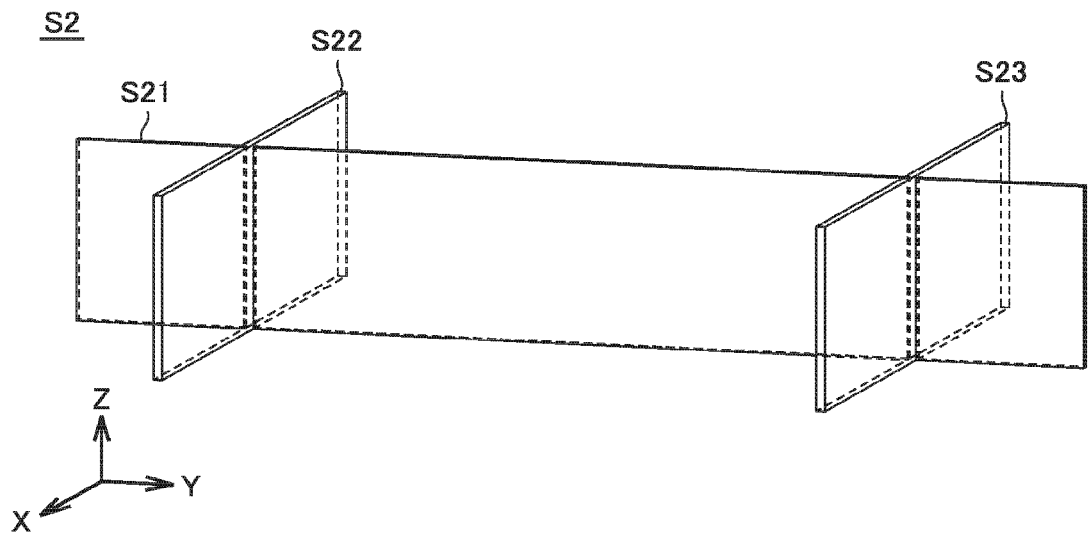
FIG. 5 is a perspective view showing an external appearance of a support member disposed on the stage in FIG. 2.
Figure 6:
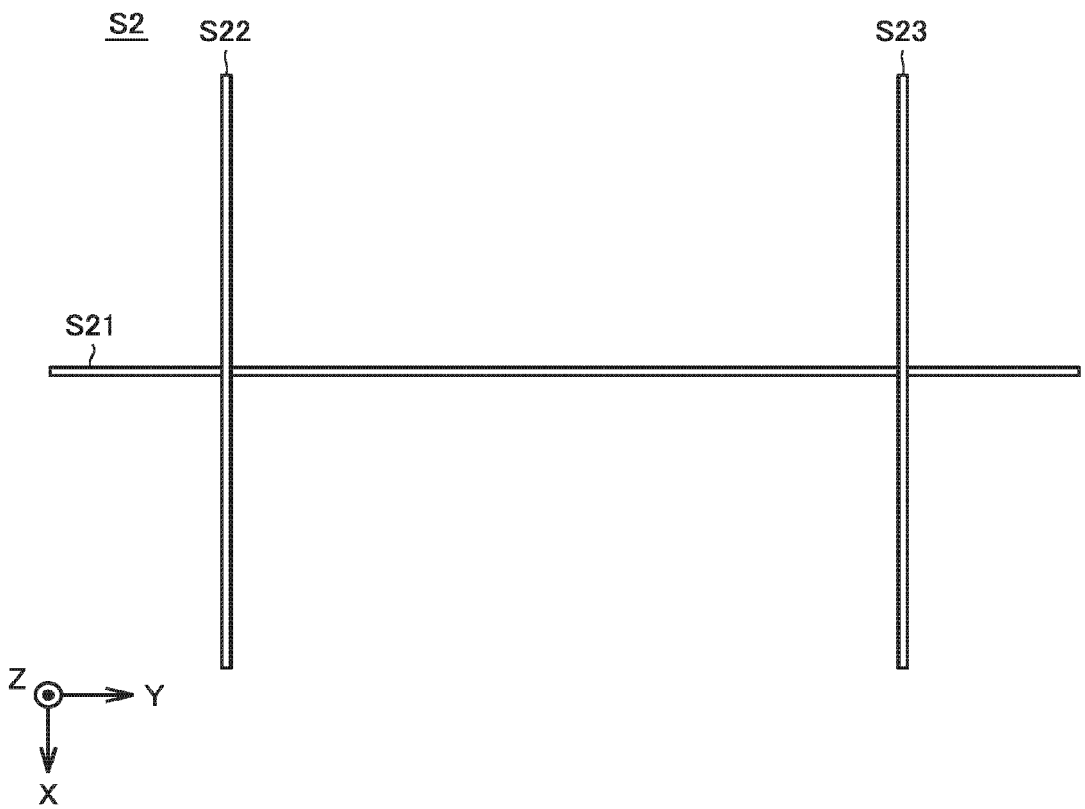
FIG. 6 is a plan view of the support member disposed on the stage in FIG. 2, viewed in the Z-axis direction.

FIG. 5 is a perspective view showing external appearances of support members S2a and S2b disposed on stage ST1 in FIG. 2. FIG. 6 is a plan view showing support members S2a and S2b disposed on stage ST1 in FIG. 2, viewed in the Z-axis direction. In FIGS. 5 and 6, support members S2a and S2b are referred to as S2.

As shown in FIGS. 5 and 6, support member S2 includes a panel S21 (the third panel), a panel S22 (the fourth panel), and a panel S23 (the fourth panel). Panels S21 and S22 are integrally formed so as to be orthogonal to each other. Panels S21 and S23 are integrally formed so as to be orthogonal to each other. Each of panels S21 to S23 is formed of an insulating material.

Panels S21 and S22 are orthogonal to each other while panels S21 and S23 are orthogonal to each other. Thereby, stage ST2 is supported by panels S21 to S23 in a well-balanced manner against vibrations in any direction, so that the quake resistance of power conversion device 100 can be further improved. Furthermore, each of panels S21 to S23 is formed of an insulating material. Thereby, the potential difference between stages ST1 and ST2 caused during the operation of power conversion device 100 is maintained, so that the influence on the operation of power conversion device 100 can be prevented.

Figure 7:
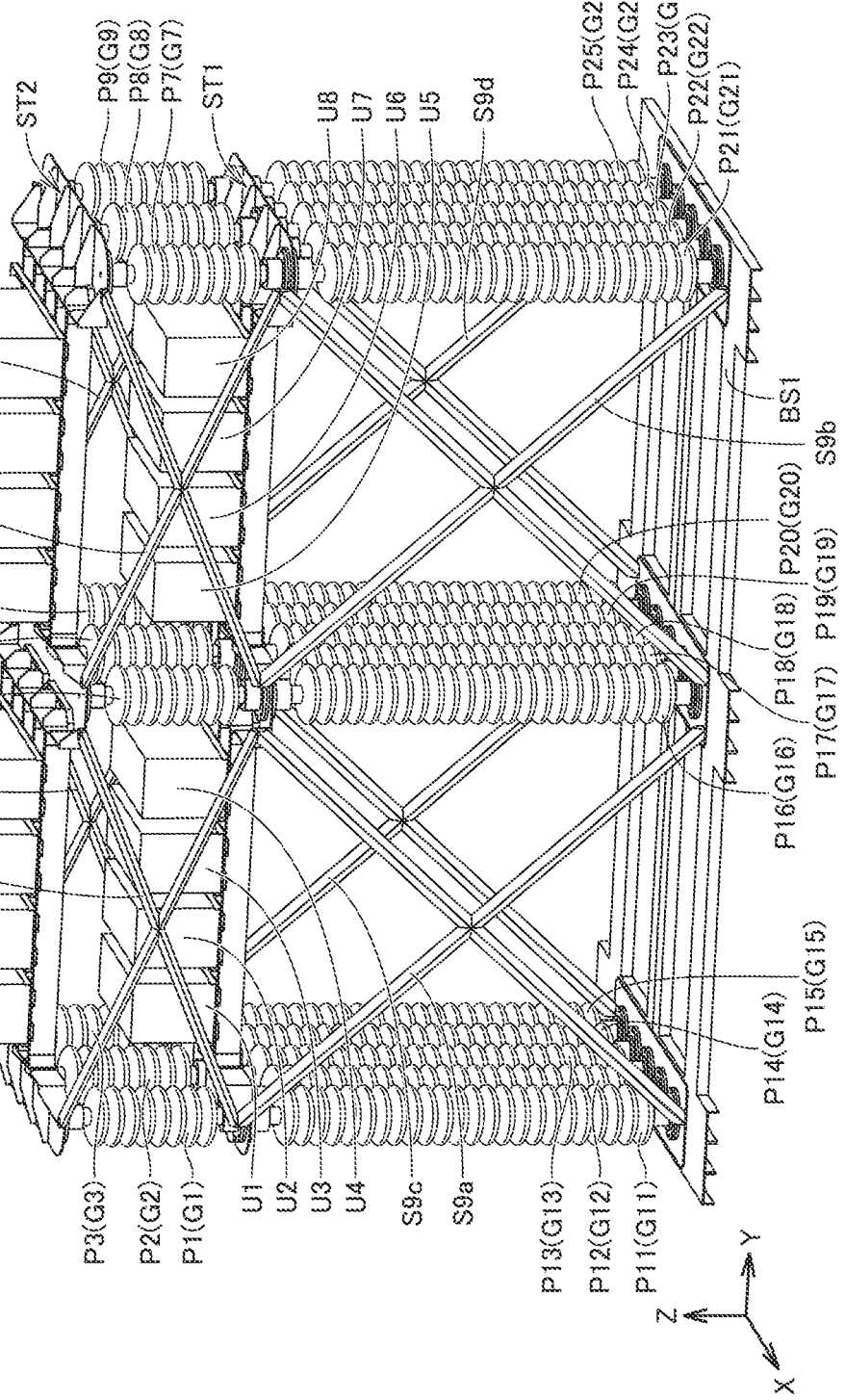
FIG. 7 is a perspective view showing an external appearance of a power conversion device according to a comparative example.

FIG. 7 is a perspective view showing an external appearance of a power conversion device 900 according to a comparative example. The configuration of power conversion device 900 is the same as the configuration of power conversion device 100 in FIG. 2 except that support members S1a, S1b, S2a, and S2b are removed and support members S9a to S9h are added. Since other configurations are the same, the description thereof will not be repeated.

As shown in FIG. 7, support members S9a to S9h form a brace structure in which two columnar members are integrally formed so as to intersect with each other. Each of support members S9a to S9d is fixed to base BS1 and stage ST1. Each of support members S9e to S9h is fixed to stages ST1 and ST2.

As to support members S9a to S9d in FIG. 7, a brace structure needs to be formed by setting the angle of intersection between the two columnar members and the length of each of these two columnar members in accordance with the distance between base BS1 and stage ST1. Similarly, as to support members S9e to S9h, a brace structure needs to be formed by setting the angle of intersection between the two columnar members and the length of each of these two columnar members in accordance with the distance between stages ST1 and ST2.

As to support members S1a and S1b in FIG. 2, the height of each panel needs to be set in accordance with the distance between base BS1 and stage ST1 while the angle of intersection between these two panels can be set independently of this distance. Similarly, as to support members S2a and S2b, the height of each panel needs to be set in accordance with the distance between stages ST1 and ST2 while the angle of intersection between these two panels can be set independently of this distance.

Support members S9a to S9d need to be designed more precisely than support members S1a, S1b, S2a, and S2b. Thus, the manufacturing cost for each of support members S9a to S9d may be higher than the manufacturing cost for each of support members S1a, S1b, S2a, and S2b. By using support members S1a, S1b, S2a, and S2b, the manufacturing cost for power conversion device 100 can be reduced below the manufacturing cost for power conversion device 900.

Furthermore, each of support members S9a to S9d needs to be fixed to base BS1 and stage ST1. Similarly, each of support members S9e to S9h needs to be fixed to stages ST1 and ST2. On the other hand, support members S1a and S1b do not need to be fixed to base BS1 and stage ST1, and also, support members S2a and S2b do not need to be fixed to stages ST1 and ST2. Thus, the assembly cost for power conversion device 900 in FIG. 7 may be higher than the assembly cost for power conversion device 100 in FIG. 2. By using support members S1a, S1b, S2a, and S2b, the assembly cost for power conversion device 100 can be reduced below the assembly cost for power conversion device 900.

As described above, according to the power conversion device in the embodiment, the quake resistance can be improved while reducing the manufacturing cost and the assembly cost.

It should be understood that the embodiments disclosed herein are illustrative and non-restrictive in every respect.

The scope of the present invention is defined by the terms of the claims, rather than the description above, and is intended to include any modifications within the meaning and scope equivalent to the terms of the claims.

REFERENCE SIGNS LIST

1 power system, 1*u* to 1*w* power transmission line, 3 controller, 4 transformer, 100, 900 power conversion device, A1 to A3 arm, BS1 base, G1 to G9, G11 to G25 insulator, P1 to P9 stage post, P11 to P25 base post, S1, S1*b*, S1*a*, S2*b*, S2*a*, S2, S9*a* to S9*h* support member, S11, S12, S21 to S23 panel, ST1, ST2 stage, U, U1 to U16 power conversion unit, UL, VL, WL AC line.

The invention claimed is:

1. A power conversion device comprising:
a base;
a first stage on which at least one first power conversion unit is mounted;
a first support portion extending in a normal direction of the base and fixed to the base and the first stage; and
a first panel and a second panel that are disposed on the base to support the first stage in the normal direction, wherein
the first panel and the second panel are integrally formed to intersect with each other.

2. The power conversion device according to claim 1, wherein the first panel is orthogonal to the second panel.

3. The power conversion device according to claim 1, wherein the first panel and the second panel are formed of an insulating material.

4. The power conversion device according to claim 1, wherein the first support portion extends in the normal direction and includes a plurality of base posts each having an outer peripheral surface formed of an insulating material.

5. The power conversion device according to claim 1, further comprising:
a second stage on which at least one second power conversion unit is mounted;
a second support portion extending in the normal direction and fixed to the first stage and the second stage; and
a third panel and a fourth panel that are disposed on the first stage to support the second stage in the normal direction, wherein
the third panel and the fourth panel are integrally formed to intersect with each other.

6. The power conversion device according to claim 5, wherein the third panel is orthogonal to the fourth panel.

7. The power conversion device according to claim 5, wherein the third panel and the fourth panel are formed of an insulating material.

8. The power conversion device according to claim 5, wherein the second support portion extends in the normal direction and includes a plurality of stage posts each having an outer peripheral surface formed of an insulating material.

\* \* \* \* \*